US010528268B2

(12) United States Patent
Seo et al.

(10) Patent No.: US 10,528,268 B2
(45) Date of Patent: Jan. 7, 2020

(54) SYSTEM AND METHOD FOR CHANNEL TIME MANAGEMENT IN SOLID STATE MEMORY DRIVES

(71) Applicant: Toshiba Memory Corporation, Minato-ku, Tokyo (JP)

(72) Inventors: Kang Seok Seo, Cupertino, CA (US); Hyoun Kwon Jeong, Pleasanton, CA (US); Jonghyeon Kim, San Jose, CA (US)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/701,966

(22) Filed: Sep. 12, 2017

(65) Prior Publication Data

US 2019/0079676 A1 Mar. 14, 2019

(51) Int. Cl.
| G06F 12/00 | (2006.01) |
| G06F 3/06 | (2006.01) |
| G06F 13/42 | (2006.01) |
| G06F 13/40 | (2006.01) |

(52) U.S. Cl.
CPC .......... *G06F 3/0611* (2013.01); *G06F 3/0659* (2013.01); *G06F 3/0688* (2013.01); *G06F 13/4063* (2013.01); *G06F 13/4234* (2013.01)

(58) Field of Classification Search
CPC .... G06F 3/0611; G06F 3/0659; G06F 3/0688; G06F 13/4234; G06F 13/4063
See application file for complete search history.

(56) References Cited

U.S. PATENT DOCUMENTS

| 5,640,529 | A | * | 6/1997 | Hasbun | G06F 3/0601 |
| | | | | | 707/999.202 |
| 6,170,042 | B1 | * | 1/2001 | Gaertner | G06F 3/0613 |
| | | | | | 710/39 |
| 6,216,178 | B1 | | 4/2001 | Stracovsky et al. | |
| 9,064,560 | B2 | | 6/2015 | Qawami et al. | |
| 9,075,538 | B2 | | 7/2015 | Fulkerson et al. | |
| 9,075,763 | B2 | | 7/2015 | Cornwell et al. | |
| 9,152,553 | B1 | | 10/2015 | Shin et al. | |
| 9,158,461 | B1 | | 10/2015 | Lee | |
| 9,311,229 | B2 | | 4/2016 | Chishtie et al. | |
| 9,354,814 | B2 | | 5/2016 | Alcantara et al. | |
| 9,417,945 | B2 | | 8/2016 | Authement et al. | |
| 9,690,515 | B2 | | 6/2017 | Tuers et al. | |

(Continued)

*Primary Examiner* — Kalpit Parikh
(74) *Attorney, Agent, or Firm* — White & Case LLP

(57) ABSTRACT

In one embodiment, a solid state storage drive comprises a plurality of flash memory devices communicatively coupled to a bus and a channel controller communicatively coupled to the bus, the channel controller comprising an execution time calculator configured to determine an aggregate execution time duration for a sequence of commands in a command execution queue based on a data transfer rate presently assigned for communications over the bus, and a channel execution unit configured to determine when to place a second command in a command execution queue based at least in part on the aggregate execution time duration. In one embodiment, the execution time calculator is further configured to determine the aggregate execution time duration based on the data transfer rate and a data payload quantity associated with at least one command in the sequence of commands.

19 Claims, 6 Drawing Sheets

(56) References Cited

U.S. PATENT DOCUMENTS

2012/0011301 A1    1/2012   Goss et al.
2013/0318285 A1   11/2013   Pignatelli
2015/0212735 A1*   7/2015   Alcantara ........... G06F 12/0246
                                                                     711/103
2016/0034415 A1    2/2016   Singh et al.

* cited by examiner

SYSTEM AND METHOD FOR CHANNEL TIME MANAGEMENT IN SOLID STATE MEMORY DRIVES

FIELD OF THE INVENTION

The invention relates generally to solid state memory drives and more particularly to a system and method for channel time management in solid state memory drives.

BACKGROUND

Non-volatile memory (NVM) is a type of computer memory that retains stored information even after power cycling—powering a device off and then on again. In contrast, volatile memory is a type of computer memory that requires power to maintain the stored information—when the power is off or interrupted, the stored data is lost. A traditional type of non-volatile memory is a hard disk drive (HDD), which stores and accesses data using one or more rotating disks (platters) coated with magnetic material.

Another type of storage memory is a solid state drive (SSD), which differs from a HDD in that digital data is stored and retrieved using electronic circuits, without any moving mechanical parts. SSDs can be used based on both volatile memory, such as dynamic random-access memory (DRAM) or static random access memory (SRAM), or non-volatile memory, such as NAND flash memory. The standard NAND flash memory can be Single Level Cell (SLC) or Multi Level Cell (MLC), including enterprise MLC (eMLC), Triple Level Cell (TLC) and Quadratic Level Cell (QLC). SSDs with NAND flash memory have been widely adopted for use in consumer products and in enterprise data centers.

A typical NAND flash memory SSD includes a memory controller and a number of NAND flash memory devices. The memory controller communicates with a host through the host interface on one side and with the NAND flash memory devices through multiple interfaces, commonly referred to as channels, on the other side. A channel controller accesses multiple NAND flash memory devices through a common shared bus interface (a channel). While each NAND flash memory device coupled to a channel may operate independently at the same time, only a single command or data payload may be transferred between the channel controller and one of the NAND flash memory devices at a given time on the shared channel. Thus communications between the channel controller and the NAND flash memory devices must be multiplexed in time. With each new generation of NAND flash memory devices, more features, larger capacities, and new timing requirements are introduced. The timing requirements, including maximum block erase times, maximum erase suspension times, and maximum page write times, should be satisfied to maintain the health of the NAND flash memory devices for their expected lifetimes. New generations of SSDs may also include larger numbers of NAND flash memory devices per channel, for example 8, 16, or more. As NAND flash memory devices per channel become more numerous and complex, the channel controller's task to time multiplex commands and data on the channel becomes more challenging. Thus there is a need for a system and method for channel time management in solid state storage drives.

BRIEF DESCRIPTION OF INVENTION

In one embodiment, a solid state storage drive comprises a plurality of flash memory devices communicatively coupled to a bus and a channel controller communicatively coupled to the bus, the channel controller comprising an execution time calculator configured to determine an aggregate execution time duration for a sequence of commands in a command execution queue based on a data transfer rate for communications over the bus, and a channel execution unit configured to determine when to place the command in a second command execution queue based at least in part on the aggregate execution time duration. In one embodiment, the execution time calculator is further configured to determine the aggregate execution time duration based on the data transfer rate and a data payload quantity associated with at least one command in the sequence of commands. In one embodiment, the execution time calculator is further configured to determine an execution time duration for the at least one command based on the data transfer rate, the data payload quantity associated with the at least one command, and a number representing a quantity of error correction coding bits. In one embodiment, the channel execution unit is configured to determine when to place the second command in the command execution queue so as to satisfy at least one timing requirement of at least one of the plurality of flash memory devices.

In one embodiment, a method comprises receiving a data transfer rate for communications over a bus communicatively coupled to a plurality of flash memory devices, receiving a first command for one of the plurality of flash memory devices in a command execution queue, calculating an execution time duration for the first command based on the data transfer rate, calculating an aggregate execution time duration for a sequence of commands in the command execution queue based on the data transfer rate, the sequence of commands including the first command, and determining when to place a second command in a command execution queue for the plurality of flash memory devices based at least in part on the aggregate execution time duration. In one embodiment, the method further comprises receiving a data payload quantity associated with the first command and wherein calculating an execution time duration for the first command is based on the data transfer rate and the data payload quantity. In one embodiment, determining when to place the second command in the command execution queue is based at least in part on at least one timing requirement of at least one of the plurality of flash memory devices.

DETAILED DESCRIPTION OF THE INVENTION

Figure 1:
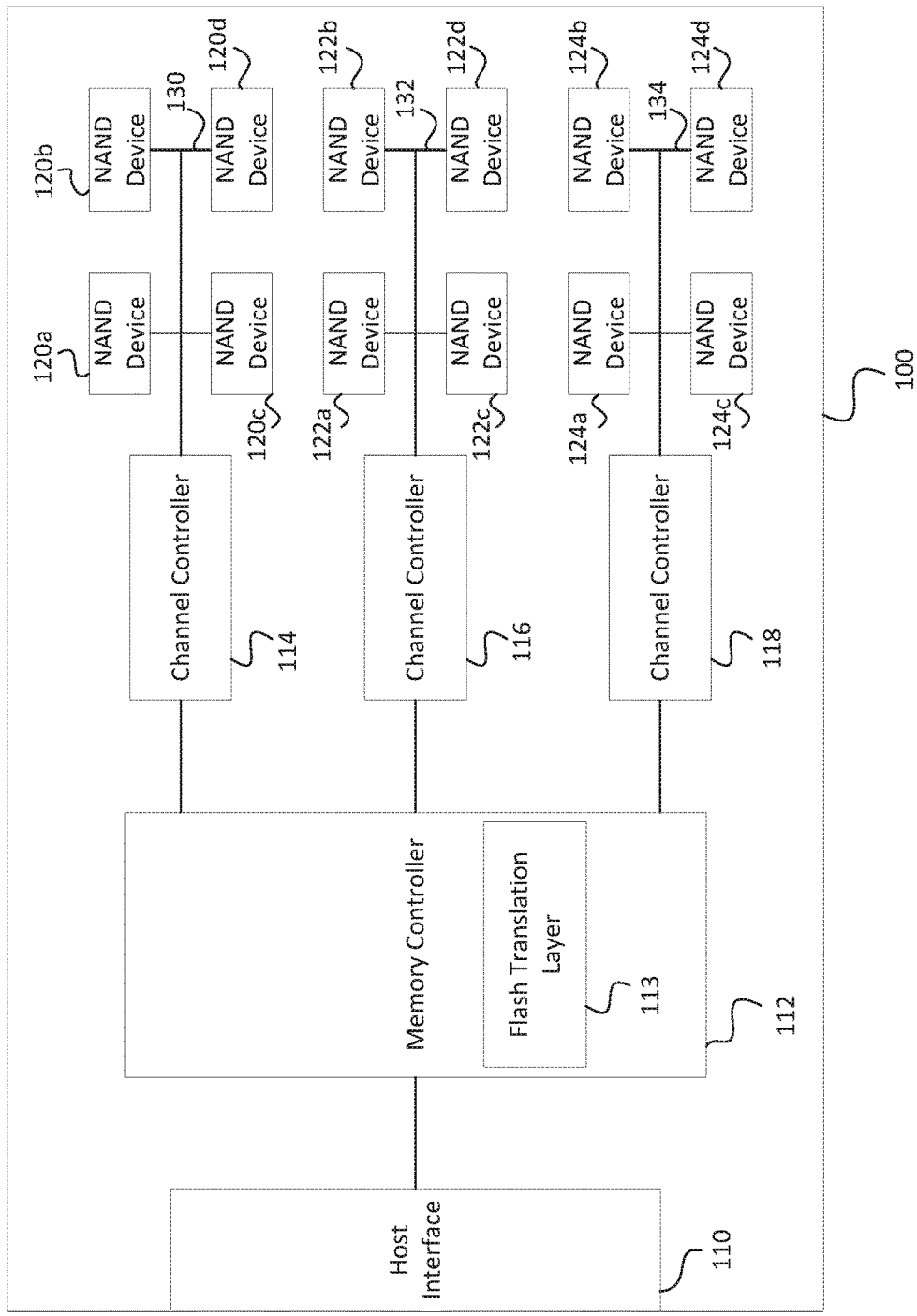
FIG. 1 is a diagram of a solid state storage drive, according to one embodiment of the invention.

FIG. 1 is a diagram of a solid state storage drive 100, according to one embodiment of the invention. Solid state storage drive 100 includes, but is not limited to, a host interface 110, a memory controller 112, a channel controller 114, a channel controller 116, a channel controller 118, NAND flash memory devices 120a-120d, NAND flash memory devices 122a-122d, and NAND flash memory devices 124a-124d. Host interface 110 enables solid state storage drive 100 to communicate with a host device (not shown). In one embodiment, host interface 110 is a PCIe connector that can be coupled to a PCIe bus (not shown) of an enterprise server or other computing system host using, for example, an NVMe protocol. Other hardware connection types (for example SATA) and other protocols (for example SCSI) are within the scope of the invention. Host interface 110 sends read and write commands from the host to memory controller 112. Memory controller 112 communicates with channel controllers 114, 116, and 118 to execute read and write commands from the host. Memory controller 112 includes a flash translation layer 113, which is firmware that translates logical block addresses provided by the host to physical addresses in one or more of NAND devices 120a-120d, 122a-122d, and 124a-124d. Memory controller 112 also performs various memory management functions including, but not limited to, erasing blocks of data, wear leveling (distributing write operations to avoid wearing out blocks of memory with repeated writes), and garbage collecting (moving valid pages in a block of memory to another block so that the original block can be erased). Although in the FIG. 1 embodiment channel controllers 114, 116, and 118 are separate from memory controller 112, in other embodiments each of channel controllers 114, 116, and 118 is integrated into memory controller 112.

Each of channel controllers 114, 116, and 118 manages a bank of NAND flash memory devices 120a-120d, 122a-122d, and 124a-124d, respectively. In the FIG. 1 embodiment each bank of NAND flash memory devices 120a-120d, 122a-122d, and 124a-124d includes four NAND flash memory devices; however, any number of NAND flash memory devices coupled to a single channel controller is within the scope of the invention. Channel controller 114 executes commands from memory controller 112 to write data to and read data from NAND devices 120a-120d over a bus (or channel) 130, channel controller 116 executes commands from memory controller 112 to write data to and read data from NAND devices 122a-122d over a bus (or channel) 132, and channel controller 118 executes commands from memory controller 112 to write data to and read data from NAND devices 124a-124d over a bus (or channel) 134. Each of channel controllers 114, 116, and 118 also executes erase commands from memory controller 112 to erase blocks of data. In one embodiment, channel controllers 114, 116, and 118 communicate with their respective NAND devices 120a-120d, 122a-122d, and 124a-124d over buses 130, 132, and 134 using a double data rate (DDR) protocol such as Toggle Mode 200, 400, or 800. During an initialization process, memory controller 112 assigns a bus frequency, i.e., a frequency of the clock signal for the bus, to each of channel controllers 114, 116, 118. For example, memory controller 112 may select a bus frequency from a set of possible frequencies including 200 MHz, 333 MHz, and 400 MHz, which correspond to a set of possible data transfer rates including 400 Mbps, 666 Mbps, and 800 Mbps, and assign that bus frequency and corresponding data transfer rate to channel controller 114. Channel controller 114 then communicates with NAND devices 120a-120d over bus 130 at the assigned data transfer rate, for example 400 Mbps, until memory controller 112 initializes channel controller 114 again.

Figure 2:
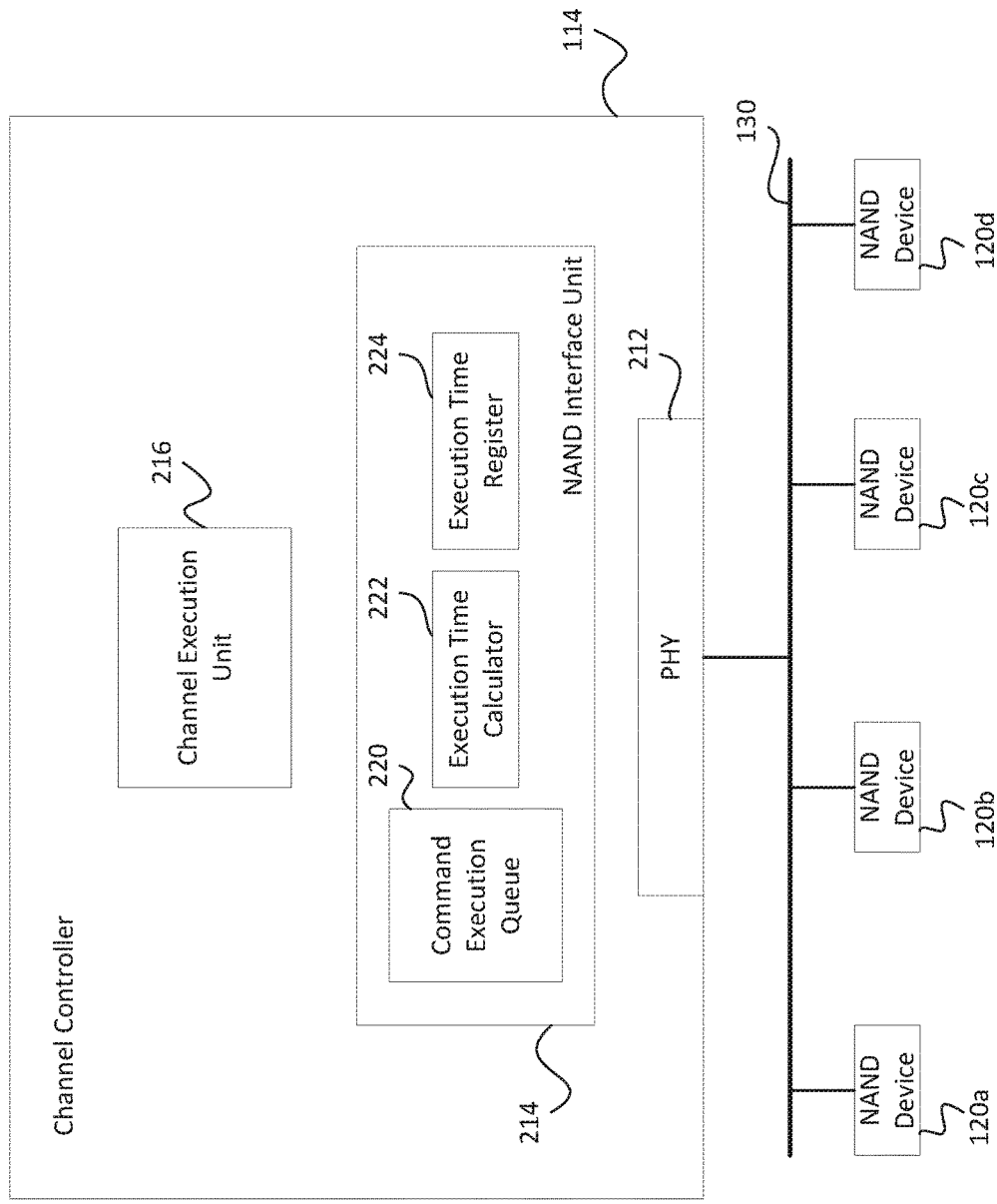
FIG. 2 is a diagram of one embodiment of a channel controller and NAND devices of FIG. 1, according to the invention.

FIG. 2 is a diagram of one embodiment of channel controller 114 and NAND flash memory devices 120a-120d of FIG. 1, according to the invention. Channel controller 114 includes, but is not limited to, a physical layer (PHY) 212, a NAND interface unit 214, and a channel execution unit 216. NAND interface unit 214 includes, but is not limited to, a command execution queue 220, an execution time calculator 222, and an execution time register 224. PHY 212 provides a physical layer interface between bus 130 and NAND flash memory devices 120a-120d that supports one or more appropriate interface protocols such as Toggle Mode 200, 400, or 800. Channel execution unit 216 is configured to receive commands from memory controller 112 and generate command sequences for NAND devices 120a-120d. Channel execution unit 216 places commands in command execution queue 220, and NAND interface unit 214 sends the commands to NAND devices 120a-120d over bus 130 for execution. The order in which channel execution unit 216 enters commands into command execution queue 220 determines the order in which NAND interface unit 214 sends the commands to PHY 212 for placement on bus 130. Each command in command execution queue 220 that is a read or write (program) command indicates the amount of data (data payload quantity) subject to the read or write operation. For example, a read command in command execution queue 220 may call for 32 kB of data to be read from NAND device 120d and a write command may call for 8 bytes of data to be written to NAND device 120b.

As set forth above, during an initialization process, memory controller 112 assigns a bus frequency and corresponding data transfer rate to channel controller 114 for communications over bus 130. Channel controller 114 provides the assigned data transfer rate to execution time calculator 222, which stores the data transfer rate as an operand. Execution time calculator 222 is configured to calculate an aggregate execution time duration for all of the commands present in command execution queue 220 and store the aggregate execution time duration in execution time register 224. When channel execution unit 216 places a command in command execution queue 220, execution time calculator 222 calculates an execution time duration for that command and adds that execution time duration to the aggregate execution time duration. When a command is removed from command execution queue 220, execution time calculator subtracts the execution time duration of that command from the aggregate execution time duration. Execution time calculator 222 continuously updates the aggregate execution time duration for commands presently in command execution queue and stores it in execution time register 224. Channel execution unit 216 is configured to read the aggregate execution time duration from execution time register 224 when channel execution unit 216 needs to make a decision on when to place an incoming command into command execution queue 220.

Execution time calculator 222 is configured to calculate an execution time duration for each read and write command placed into command execution queue 220 based on the data transfer rate presently assigned for communications over bus 130, an execution time for command information, and the data payload quantity for the command. In one embodiment, execution time calculator 222 is a hardware circuit including adders and multipliers. For example, channel controller 114 may place a read command to read 32 KB of data from NAND device 120c into command execution queue 220. Execution time calculator 222 uses the presently-assigned data transfer rate for bus 130, such as 400 Mbps, the execution time for the read command information, and the payload quantity of the read command to calculate an execution time duration for the command. Execution time calculator 222 includes a table of execution times for each type of command at each possible data transfer rate. For example, execution time calculator 222 stores the execution time for read command information (e.g., a set of bits that identifies the command as "read" and a set of bits that identifies the address of the data to be read) for data transfer rates of 400, 666, and 800 Mbps. Execution time calculator 222 also uses knowledge of the type of error correction coding (ECC) that was applied to the data prior to being written to NAND device 120c as part of the calculation of the execution time duration. For the read command with a 32 KB payload, execution time calculator 222 adds a number of bytes representing the appropriate number of ECC bits to the 32,000 bytes of the payload. Execution time calculator 222 then divides that value by the data transfer rate of 4000 Mbps to produce a result that is a time duration, typically a number of microseconds (µs). Execution time calculator 222 adds the execution time for the read command information to the calculated time duration for the data payload to produce the execution time duration for the read command. Execution time calculator adds the calculated execution time duration for the read command to the execution time durations previously calculated for the other commands in command execution queue and stores the updated aggregate execution time duration in execution time register 224.

Execution time calculator 222 also determines an execution time duration for commands that do not have a data payload. For example, the execution times for an erase command and a suspend erase command sent over bus 130 to NAND device 120d at each of the possible data transfer rates are stored by execution time calculator 222. In one embodiment, the execution time duration for an erase command is based on the required time to send the erase command information (e.g., a set of bits that identifies the command as "erase" and a set of bits that identifies the address of a block of data to be erased) one of NAND devices 120a-120d.

Channel execution unit 216 is configured to retrieve the aggregate execution time duration for the commands presently in command execution queue 220 from execution time register 224. In certain circumstances, channel execution unit 216 determines when to place a command in command execution queue 220 based on the aggregate execution time duration for commands currently pending in command execution queue 220. Channel execution unit 216 stores various timing requirements for NAND devices 120a-120d, such as a maximum erase time, a maximum erase suspension time, a maximum read time, and a maximum write time. The aggregate execution time duration calculated by execution time calculator 222 enable channel execution unit 216 to place commands in command execution queue 220 such that the timing requirements of NAND devices 120a-120d are satisfied.

Figure 3:
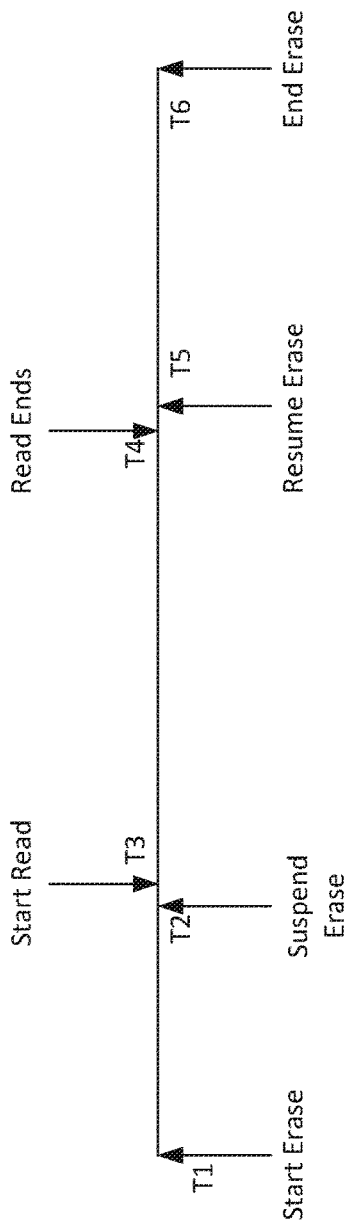
FIG. 3 is a diagram showing one embodiment of timing of commands for execution by a NAND flash memory device, according to the invention.

FIG. 3 is a diagram showing one embodiment of timing of commands for execution by a NAND flash memory device, according to the invention. At a time T1, a channel controller such as channel controller 114 sends an erase command to a NAND flash memory device such as NAND device 120c to erase a block of data. Completing an erase operation typically takes much longer than completing a read operation, so if data stored in a NAND device that is currently performing an erase operation is requested in a read command, channel controller 114 can suspend the erase operation and start the read operation for the requested data. At a time T2, channel controller 114 sends a suspend erase command to NAND device 120c and then at a time T3 sends a read command to NAND device 120c. Execution of the read command includes NAND device 120c receiving the read command and sending the requested data over bus 130 to channel controller 114. At a time T4, NAND device 120c completes the read operation and at a time T5 channel controller 114 sends a command to NAND device 120c to resume the suspended erase operation. At a later time T6, NAND device 120c completes the erase operation.

Figure 4A:
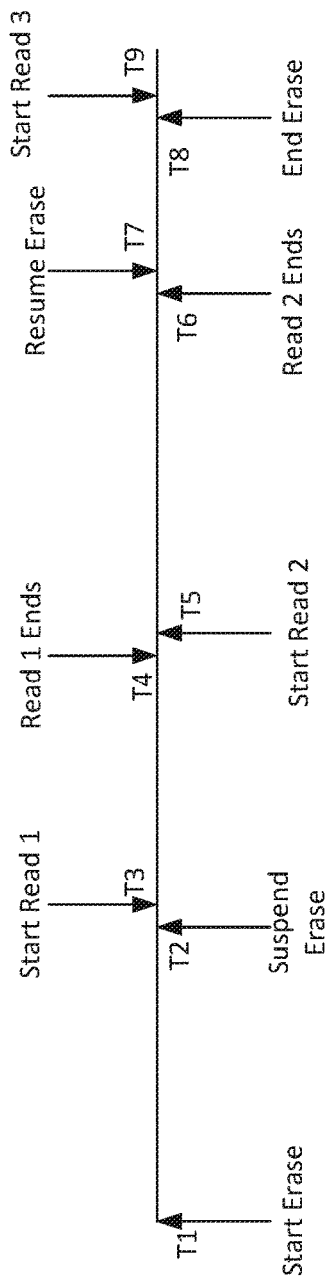
FIG. 4A is a diagram of one embodiment of timing of commands for execution by a NAND flash memory device, according to the invention.

FIG. 4A is a diagram showing another embodiment of timing of commands for execution by a NAND flash memory device, according to the invention. At a time T1, channel controller 114 sends an erase command to a NAND flash memory device such as NAND device 120a to erase a block of data. At a time T2, channel controller 114 sends a command to NAND device 120a to suspend the erase operation and then at a time T3 sends a first read command (Read 1) to NAND device 120a. At a time T4, the first read command completes and at a time T5 channel controller 114 sends a second read command (Read 2) to NAND device 120a.

Figure 4B:
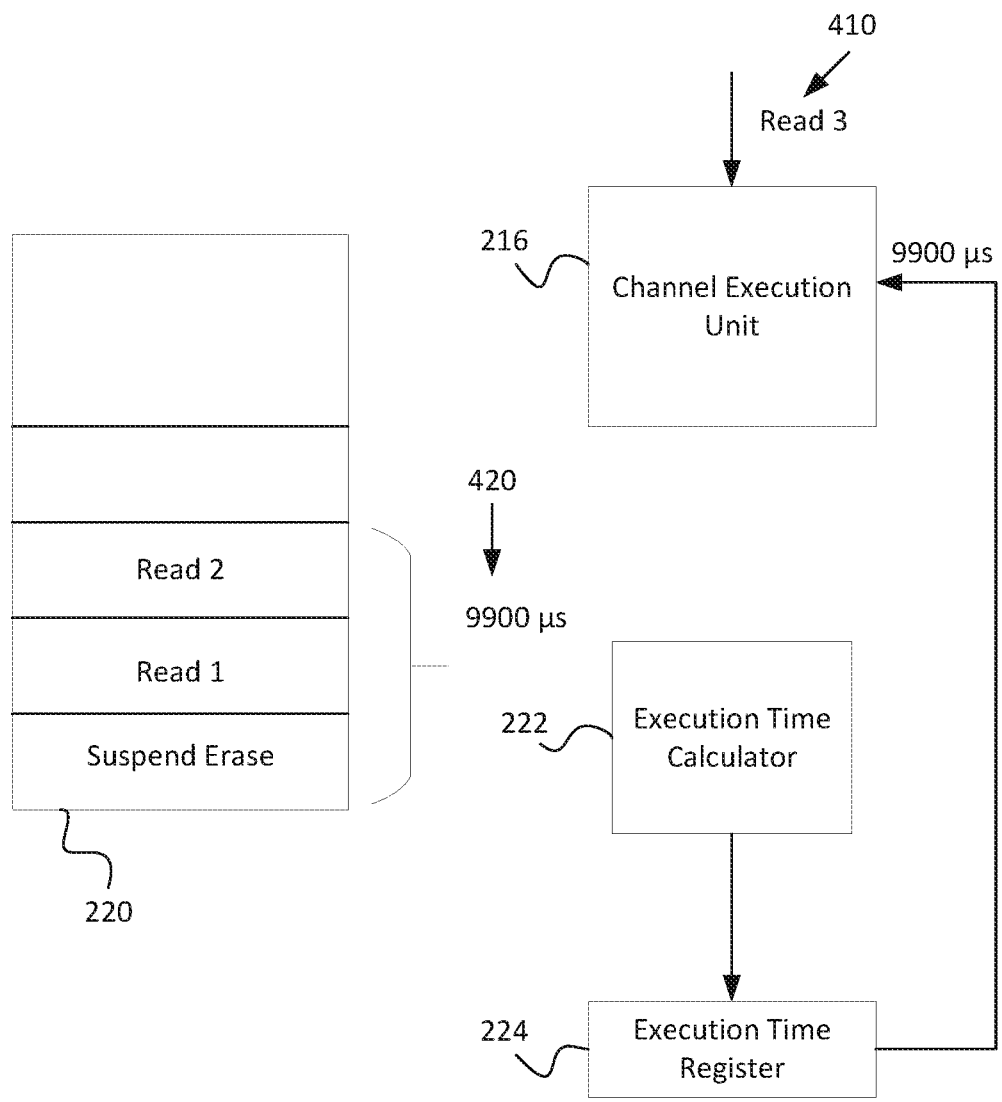
FIG. 4B is a diagram showing one embodiment of commands in a command execution queue for execution by a NAND flash memory device, according to the invention.

FIG. 4B is a diagram showing one embodiment of commands in command execution queue 220 for execution by a NAND flash memory device, according to the invention. Command execution queue 220 stores a sequence of commands for NAND flash memory devices 120a-120d. In the FIG. 4B embodiment, the commands shown in command execution queue 220 are for execution by a single NAND device, such as NAND device 120a, for ease of illustration. Execution time calculator 222 calculates an aggregate execution time duration 420 for commands presently pending in command execution queue 220. In the FIG. 4B embodiment, the aggregate execution time duration is 1000 µs. For each of the read commands in command execution queue 220, execution time calculator had previously determined an execution time duration based on the data payload, the appropriate number of ECC bits, the execution time for sending read command information over bus 130, and the presently-assigned data transfer rate for communications over bus 130.

Channel execution unit 216 receives a read command (Read 3) 410 to be executed by NAND device 120a. Channel execution unit 216 compares aggregate execution time duration 420 for the commands currently pending in command execution queue 220 with one or more appropriate timing requirements for NAND device 120a. Because a suspend erase operation is scheduled to occur, channel execution unit 216 will need to determine whether placing read command 410 into command execution queue 220 immediately after the Read 2 command would violate a maximum erase suspend timing requirement of NAND device 120a. Channel execution unit 216 reads aggregate execution time duration 420 from execution time register 224. In the FIG. 4B embodiment, aggregate execution time duration 420 equals 9900 µs and the maximum suspend time requirement for NAND device 120a is 1000 µs. If, for example, channel execution unit 216 determines that only 100 µs of allowed erase suspend time remain, channel execution unit 216 decides that the read command 410 should not be placed in command execution queue 220 and that the next appropriate command for NAND device 120a is a resume erase command. Channel execution unit 216 places read command 410 into command execution queue 220 following the resume erase command.

Returning to FIG. 4A, the second read operation (Read 2) ends at a time T6 and channel controller 114 sends a resume erase command to NAND device 120a at a time T7. At a time T8, the erase operation ends and at a time T9 channel controller 114 sends a read command (Read 3) to NAND device 120a.

Figure 4C:
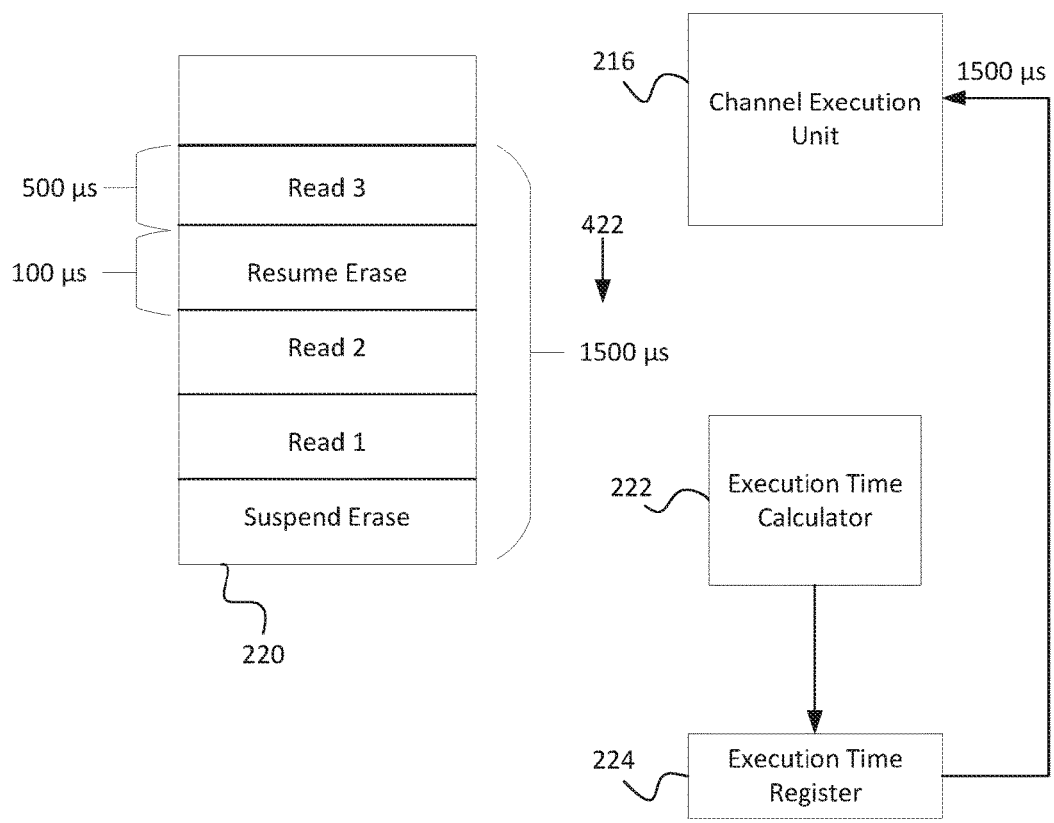
FIG. 4C is a diagram showing one embodiment of commands in a command execution queue for execution by a NAND flash memory device, according to the invention.

Referring to FIG. 4C, channel execution unit 216 has placed a resume erase command and read command (Read 3) 410 in command execution queue 220. Execution time calculator 222 calculates an execution time duration for the resume erase command and read command 410. The execution time duration for read command 410 is based in part on the data payload to be read from NAND device 120a. Execution time calculator 222 adds the execution time durations for these two new commands (100 µs for the resume erase command and 500 µs for the read command) to the prior aggregated execution time duration, and stores the sum in execution time register 224 as the current aggregated execution time duration. The aggregate execution time duration calculated by execution time calculator 222 enables channel execution unit 216 to place commands in command execution queue 220 such that timing requirements of NAND devices 120a-120d are satisfied, which maintains the health of solid state storage drive 100 over its expected lifetime.

Figure 5:
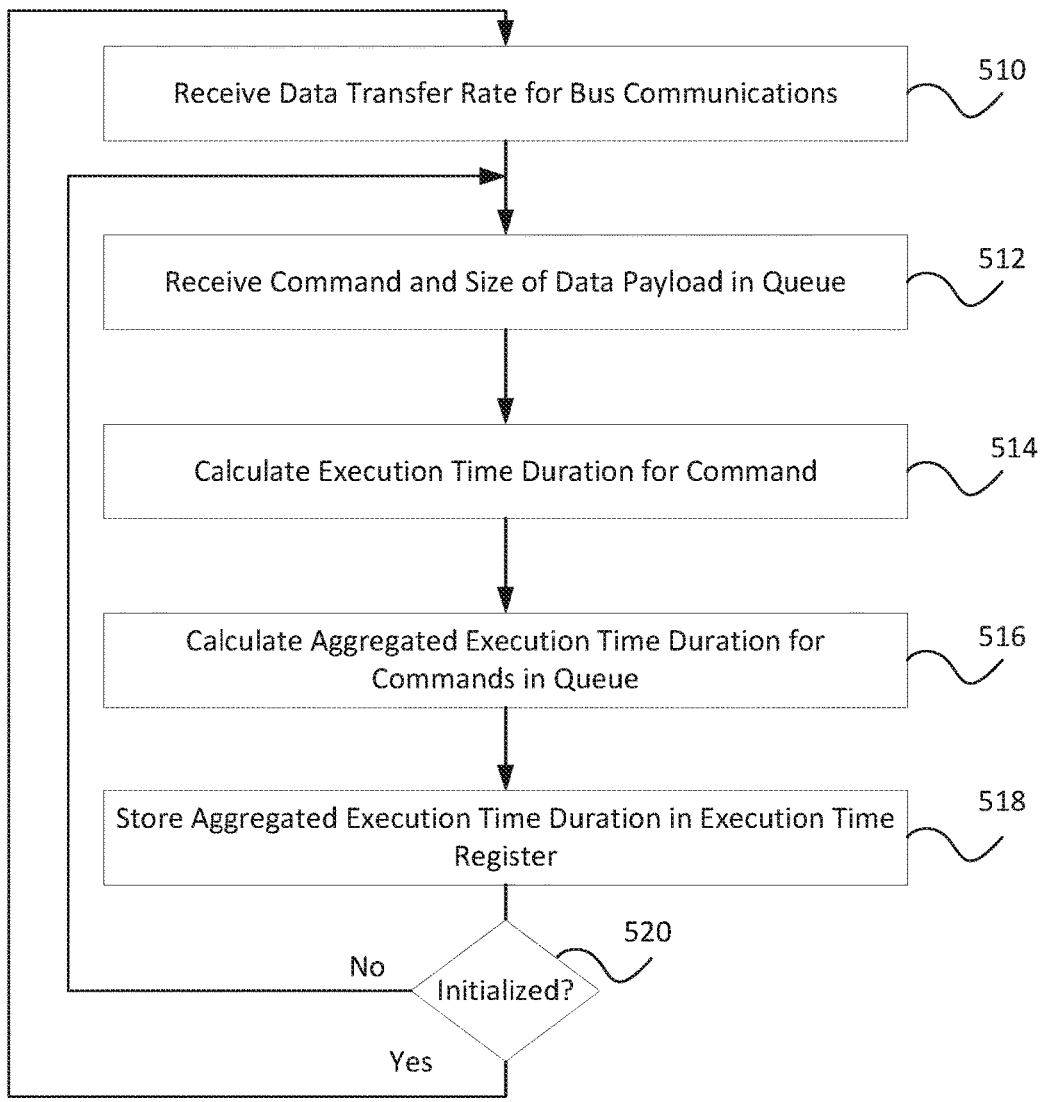
FIG. 5 is a flowchart of method steps for channel time management in a solid state memory drive, according to one embodiment of the invention.

FIG. 5 is a flowchart of method steps for channel time management in a solid state memory drive, according to one embodiment of the invention. In step 510, execution time calculator 222 receives a data transfer rate that channel controller 114 has been assigned to use for communications with NAND devices 120a-120d over bus 130. In one embodiment, the data transfer rate is expressed as a number of bits per second, such as 400 Mbps. In step 512, execution time calculator 222 receives a read or write command and the size of the data payload for the read or write command from channel execution unit 216. The data payload of read and write commands can vary widely. For example, one read command may call for a few bytes of data and another read command may call for several kilobytes of data. In other embodiments, execution time calculator 222 receives a command with no data payload, for example, an erase command. In step 514, execution time calculator 222 calculates an execution time duration for the command. In one embodiment, execution time calculator 222 adds to the data payload amount a number of bytes representing an appropriate number of ECC bits. For example, channel controller 114 may implement an error correcting code that results in 24 ECC bits for every 512 bytes of user data. In that case, execution time calculator 222 would add 24 bits, representing the 24 ECC bits, to the command data payload of 512 bytes. Execution time calculator 222 also looks up an execution time for read or write command information (e.g., a set of bits that identifies the command as "read" or "write," and the address in the NAND flash memory device). Execution time calculator 222 then divides the sum of the payload and ECC bits by the presently-assigned data transfer rate and then adds the execution time for read or write command information to produce the execution time duration for the command.

In step 516, execution time calculator 222 calculates an aggregated execution time duration for all of the commands in command execution queue 220. In one embodiment, execution time calculator 222 subtracts an execution time duration for a command that has been removed from command execution queue 220 and adds an execution time duration for a command that has been newly added to command execution queue 220 to a current aggregated execution time duration to produce an updated aggregated execution time duration. In step 518, execution time calculator 222 stores the just-calculated aggregated execution time duration in execution time register 224. In step 520, execution time calculator 222 determines whether channel controller 114 has been initialized. If not, then the method returns to step 512. If channel controller 114 has been initialized, the method returns to step 510 to receive the currently assigned data transfer rate for bus communications.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A solid state storage drive comprising:
   a plurality of flash memory devices communicatively coupled to a bus; and
   a channel controller communicatively coupled to the bus, the channel controller comprising
      an execution time calculator configured to determine an aggregate execution time duration for a sequence of commands in a command execution queue based on a data transfer rate for communications over the bus, the data payload quantity associated with the at least one command, and a number representing a quantity of error correction coding bits, and
      a channel execution unit configured to determine when to place a second command in the command execution queue based at least in part on the aggregate execution time duration.

2. The solid state storage drive of claim 1, wherein the execution time calculator is further configured to determine the aggregate execution time duration based on the data transfer rate for communications over the bus and a data payload quantity associated with at least one command in the sequence of commands.

3. The solid state storage drive of claim 1, wherein the execution time calculator is further configured to recalculate the aggregate execution time duration when one of the sequence of commands is removed from the command execution queue.

4. The solid state storage drive of claim 1, execution time calculator is further configured to recalculate the aggregate execution time duration when the second command is added to the command execution queue.

5. The solid state storage drive of claim 1, wherein the channel execution unit is configured to determine when to place the second command in the command execution queue so as to satisfy at least one timing requirement of at least one of the plurality of flash memory devices.

6. The solid state storage drive of claim 5, wherein the at least one timing requirement is one of a maximum erase time, a maximum suspend erase time, a maximum write time, and a maximum read time.

7. The solid state storage drive of claim 1, wherein the channel controller further comprises a register configured to receive the aggregate execution time duration from the execution time calculator, and wherein the channel execution unit is configured to read the aggregate execution time duration from the register.

8. The solid state storage drive of claim 1, wherein the second command is a read command or a write command.

9. The solid state storage drive of claim 1, wherein the data transfer rate for communications over the bus was assigned to the channel controller during initialization of the channel controller.

10. A method comprising:
receiving a data transfer rate for communications over a bus communicatively coupled to a plurality of flash memory devices;
receiving a first command for one of the plurality of flash memory devices in a command execution queue;
calculating an execution time duration for the first command based on the data transfer rate;
calculating an aggregate execution time duration for a sequence of commands in the command execution queue based on the data transfer rate, the sequence of commands including the first command; and
determining when to place a second command in a command execution queue for the plurality of flash memory devices based at least in part on the aggregate execution time duration.

11. The method of claim 10, further comprising
receiving a data payload quantity associated with the first command, and
wherein calculating the execution time duration for the first command is based on the data transfer rate and the data payload quantity associated with the first command.

12. The method of claim 11, wherein calculating the execution time duration for the first command is based on the data transfer rate, the data payload quantity associated with the first command, and a number representing a quantity of error correction coding bits.

13. The method of claim 10, wherein calculating the aggregate execution time duration includes subtracting an execution time duration for a command removed from the command execution queue.

14. The method of claim 10, further comprising
calculating an execution time duration for the second command based on the data transfer rate when the second command has been placed in the command execution queue; and
calculating the aggregated execution time duration for the sequence of commands in the command execution queue, the sequence of commands including the second command.

15. The method of claim 10, wherein determining when to place the second command in the command execution queue is based at least in part on at least one timing requirement of at least one of the plurality of flash memory devices.

16. The method of claim 15, wherein the at least one timing requirement is one of a maximum erase time, a maximum suspend erase time, a maximum write time, and a maximum read time.

17. The method of claim 10, wherein the first command is a read command or a write command.

18. The method of claim 10, wherein the data transfer rate for communications over the bus was assigned to the channel controller during initialization of the channel controller.

19. The method of claim 10, wherein the data transfer rate for communications over the bus corresponds to a double data rate clock frequency.

* * * * *